UNITED STATES PATENT OFFICE.

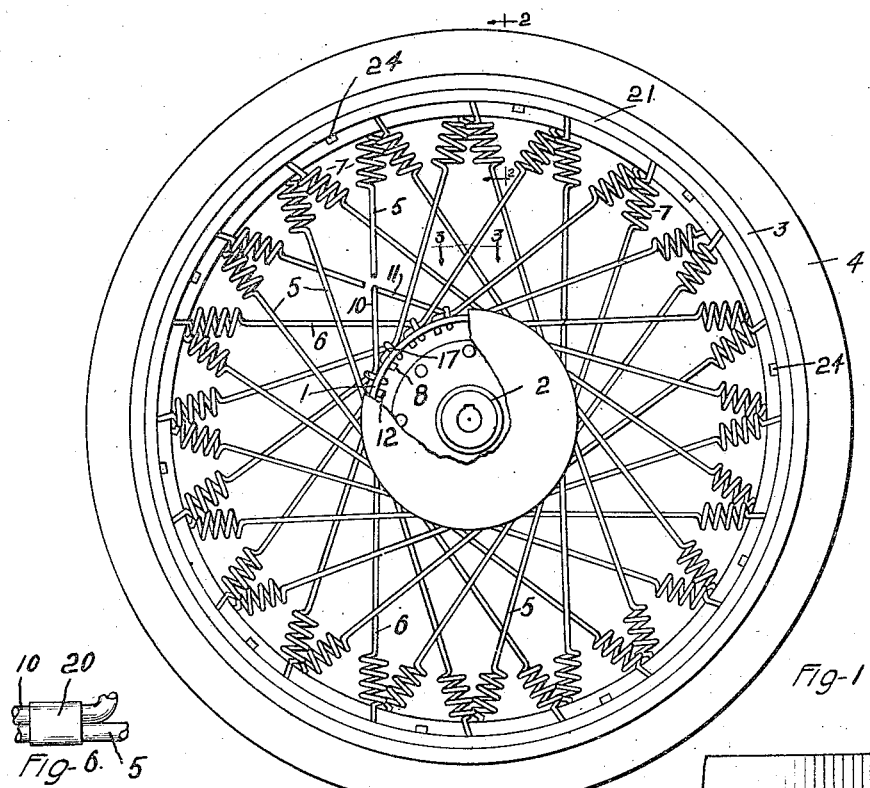

JOSEPH A. CRISMORE, OF BERWYN, ILLINOIS; WILLIAM A. CARSON ADMINISTRATOR OF SAID JOSEPH A. CRISMORE, DECEASED.

RESILIENT WHEEL.

1,243,265. Specification of Letters Patent. Patented Oct. 16, 1917.

Application filed April 28, 1915. Serial No. 24,386.

*To all whom it may concern:*

Be it known that I, JOSEPH A. CRISMORE, a citizen of the United States, residing at Berwyn, county of Cook, State of Illinois, have invented a certain new and useful Improvement in Resilient Wheels, and declare the following to be a full, clear, and exact description of the same, such as will enable others skilled in the art to which it pertains to make and use the same, reference being had to the accompanying drawings, which form a part of this specification.

My invention has for its object to produce a simple, strong and durable wheel structure which shall be inherently resilient so as to serve effectually as a cushion for a vehicle body and make it possible to dispense with pneumatic tires which are now so largely used.

A further object of my invention is to produce an inherently resilient wheel which shall not only be mechanically efficient but which shall be attractive in appearance.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a wheel arranged in accordance with a preferred form of my invention, the portion of the hub cap broken away and the inner portions of two of the spokes broken away to show one of the braces;

Fig. 2 is a section on an enlarged scale taken approximately on line 2—2 of Fig. 1;

Fig. 3 is a view on an enlarged scale taken approximately on line 3—3 of Fig. 1, only two of the spokes being shown;

Fig. 4 is a section taken approximately on line 4—4 of Fig. 3;

Fig. 5 is a side view on a different scale from Figs. 1 and 3 of one of the braces; and Fig. 6 is an elevation of a fragment of one of the spokes and the adjacent brace showing a modified connecting means.

Referring to the drawing, 1 represents a hub of any suitable construction which, in the arrangement illustrated, is in the form of a hollow cylinder of considerable diameter within which is fixed a hub member, 2, adapted to receive the axle. 3 represents a rim which, if desired, may be provided with a tire, 4, of cushioning material or any other material.

In accordance with my invention I connect the hub and the rim together by spokes of strong stiff wire which are arranged in two groups lying tangentially as distinguished from radially, the spokes of the two groups being disposed reversely with respect to each other so that they cross each other, viewing the wheel from the side. The spokes are also so disposed that the two groups cross each other as viewed from a point in the plane of the wheel, each spoke extending from one side of the hub to the opposite side of the wheel. The disposition of the spokes is further such that the outer end of each spoke is in the same plane containing the axis of the wheel as the outer end of what may be called the corresponding spoke in the other group or series. Consequently it may be said that the spokes of the two groups are symmetrically disposed with respect to radii passing through their points of connection with the rim. Furthermore, for each spoke in one series there will be a spoke in the other series lying parallel therewith, these two spokes being symmetrically disposed with respect to a radius extending between them and parallel thereto. The spokes in one series or group are indicated by the reference character 5 while those in the other series or group are indicated by the reference character 6. In the outer portion of each spoke, beyond the points where it crosses the spokes of the other series or group is a coiled or helical spring, 7, coaxial with the spoke.

The ends of the spokes being rigidly connected to the hub and the rim in any suitable manner, the load to be carried by the wheel which comes in the first instance upon the hub is suspended in a large number of perfect yieldable swings which effectively cushion it against shocks and jars incident to riding over rough or uneven roads. I have found, however, that with the simple construction just described, there is a tendency on the part of the hub to move back and forth in the axial direction, particularly in the case of the wheels of a vehicle in the act of turning a corner. In order to overcome this tendency to relative movements in the axial direction between the hub and the rim I have provided means for rigidly pressing the inner portions of the spokes, by securing braces between the hub and sections of considerable length at the inner end of each spoke of one series and the corresponding portion of a crossing spoke of the other series. In the arrangement shown, the inner ends of the spokes are bent at right angles as indicated at 8, the portions, 8, being inserted through holes, 9, in the hub. Each brace consists of a V-shaped member having two arms, 10 and 11, and hooked ends, 12 and 13. The arm 10 is adapted to lie beside the inner portion of one of the spokes 5 while the hooked end, 12, projects through an opening, 14, lying just beside the opening 9 through which the bent or hooked end of the spoke 5 projects. The arm 11, which is displaced to one side so as not to lie in the same plane as the arm 10, lies beside the inner end of one of the spokes 6 which crosses the spoke 5, while the hooked end, 13, projects into a hole, 15, in the hub lying just beside the hole 16 in which the end of the spoke 6 is fitted. Staple-like members, 17, straddling the members 5 and 10 and the members 6 and 11, respectively, and passing through suitably spaced openings, 18, lying at some distance from the openings 9 and 14 and the openings 15 and 16, respectively, and each having at least one of its ends riveted or bent laterally on the inner side of the hub as indicated at 17ª, hold the inner ends of the spokes and the braces firmly to the hub. If desired, additional security may be obtained by welding the ends of the braces and the supports to the hubs. The arms, 10 and 11, of the braces are fastened in any suitable way to the adjacent parts of the spokes so that the inner ends of the spokes and the braces form a rigid structure. This connection between the brace and the spokes may be produced by welding them together or, as indicated in Fig. 6, bands or rings, 20, may be passed around each arm of each brace and the corresponding spoke near the apex of the brace; the ring or band being shrunk on or welded. By thus forming an approximately triangular rigid structure between the ends of each spoke of one series and another spoke of the other series, great stiffness in the lateral direction is obtained and the tendency of the hub to move in the axial direction relative to the rim is overcome without interfering in any way with the effective cushioning qualities of the wheel.

The outer ends of the spokes may be fastened to the rim in any suitable way. In the arrangement shown, there is placed within the main rim, 3, an auxiliary rim, 21, having a concave or channeled exterior which produces an annular inclosed chamber just inside of the main rim. The spokes are passed through openings in the auxiliary rim and have their ends bent laterally as indicated at 22 which prevents the withdrawal of the spokes. The auxiliary rim is secured to the main rim in any suitable way as, for example, by means of studs or bolts, 24, passing through the auxiliary rim into the main rim. The parts are preferably so proportioned that when the bolts are tightened the ends, 22, of the spokes are clamped tightly in place so that there will be no looseness and consequent rattling.

While I have illustrated and described with particularity only a single preferred form of my invention I do not desire to be limited to the exact structural details thus illustrated and described; but intend to cover all forms and arrangements which come within the terms employed in the definitions of my invention constituting the appended claims.

I claim:

1. In a wheel, a hub, a rim, spokes connecting the hub and the rim together, the spokes being in two groups which cross each other between the hub and the rim, and a V-shaped brace having its arms lying beside and secured to those portions of each pair of spokes lying between the hub and the point of crossing.

2. In a wheel, a hub, a rim, spokes connecting the hub and rim together, the spokes being in two groups which cross each other between the hub and rim, means for rigidly tying the inner portions of each pair of crossing spokes together between the point of crossing and the hub, the outer portion of each spoke being bent into a helical spring coaxial with the spoke.

3. In a wheel, a hub, a rim, spokes connecting the hub and the rim together, the spokes being arranged in two oppositely-arranged tangential groups crossing each other as viewed from the side of the wheel and also from a point in the plane of the wheel, each spoke having in the outer portion a section in the form of a spring, and a brace extending from the hub along the inner portions of each pair of crossing spokes and firmly secured to the hub and the adjacent spokes.

4. In a wheel, a hub, a rim, spokes connecting the hub and the rim together, the spokes being arranged in two oppositely-arranged tangential groups crossing each other as viewed from the side of the wheel and also from a point in the plane of the wheel, each spoke having in the outer portion a section in the form of a spring, and V-shaped braces each having its arms lying beside and secured to the inner portions of two crossing spokes and its ends fixed to the hub.

5. In a wheel, a hub, a rim, spokes connecting the hub and the rim together, the spokes being arranged in two oppositely-arranged tangential groups crossing each other as viewed from the side of the wheel and also from a point in the plane of the wheel, V-shaped braces each having its arms lying beside and secured to the inner portions of two crossing spokes, the inner ends of the spokes and of the braces being bent laterally and passing through openings in the hub, and a clip passing over each spoke and the adjacent brace member for securing them to the hub.

6. In a wheel, a hub, a rim, spokes connecting the hub and the rim together, the spokes being in two groups which cross each other between the hub and the rim, a brace lying between the inner ends of each pair of crossing spokes and fixed to the hub, and means for securing each brace to the two adjacent spokes.

7. In a wheel, a hub, a rim, spokes arranged in two oppositely-arranged tangential groups crossing each other as viewed from the side of the wheel and also from a point in the plane of the wheel, means for securing the inner ends of the spokes to the hub, the outer ends of said spokes being bent laterally, and an auxiliary rim secured within the aforesaid rim and clamping the laterally bent ends of the spokes thereto.

In testimony whereof, I sign this specification.

JOSEPH A. CRISMORE.